May 22, 1945.   W. S. GUBELMANN   2,376,481
ACCOUNTING MACHINE
Original Filed Jan. 22, 1929   8 Sheets-Sheet 1

INVENTOR
WILLIAM S. GUBELMANN
BY
ATTORNEYS

May 22, 1945.   W. S. GUBELMANN   2,376,481
ACCOUNTING MACHINE
Original Filed Jan. 22, 1929   8 Sheets-Sheet 3

INVENTOR
WILLIAM S. GUBELMANN
BY
ATTORNEYS

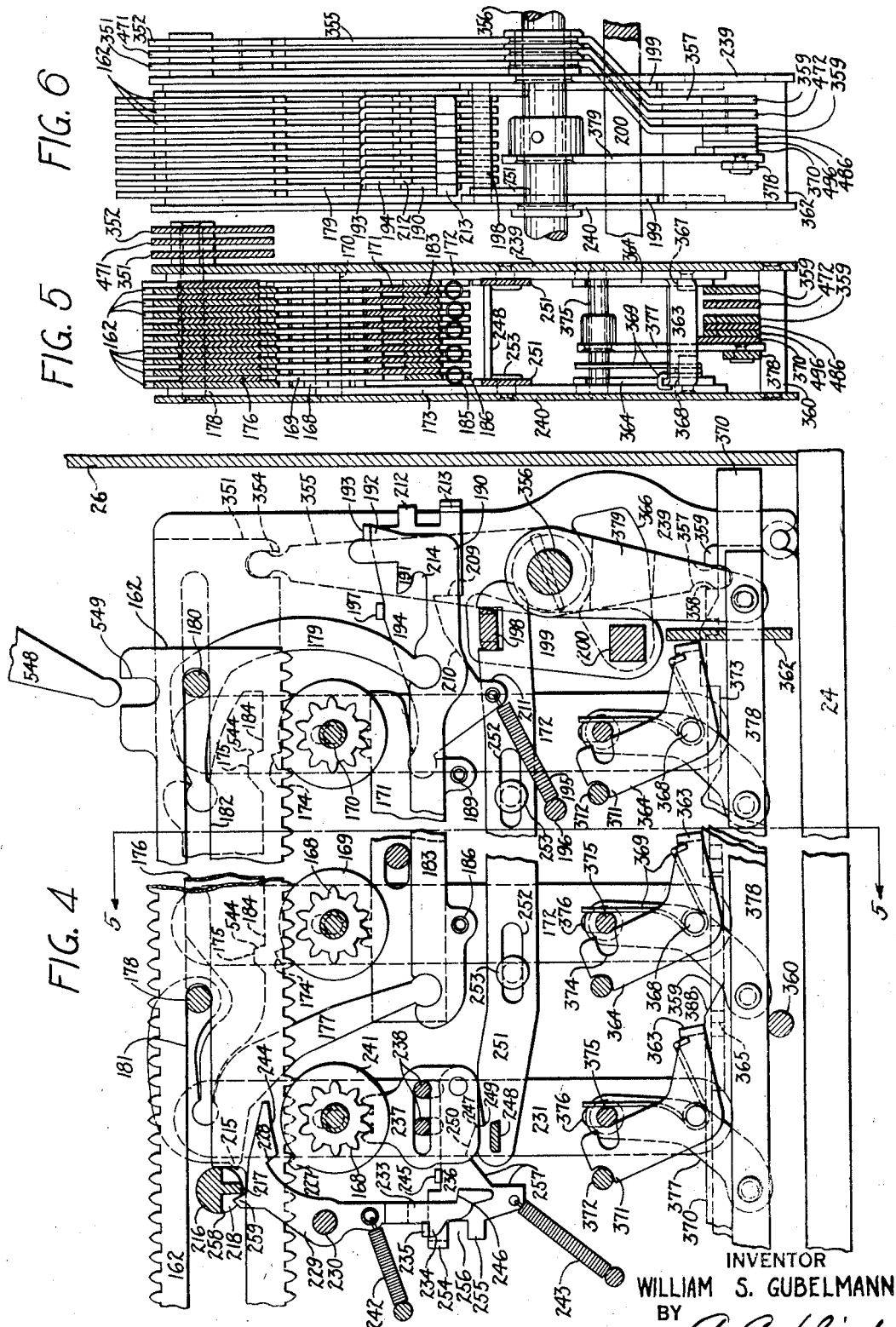

May 22, 1945.   W. S. GUBELMANN   2,376,481
ACCOUNTING MACHINE
Original Filed Jan. 22, 1929   8 Sheets-Sheet 5
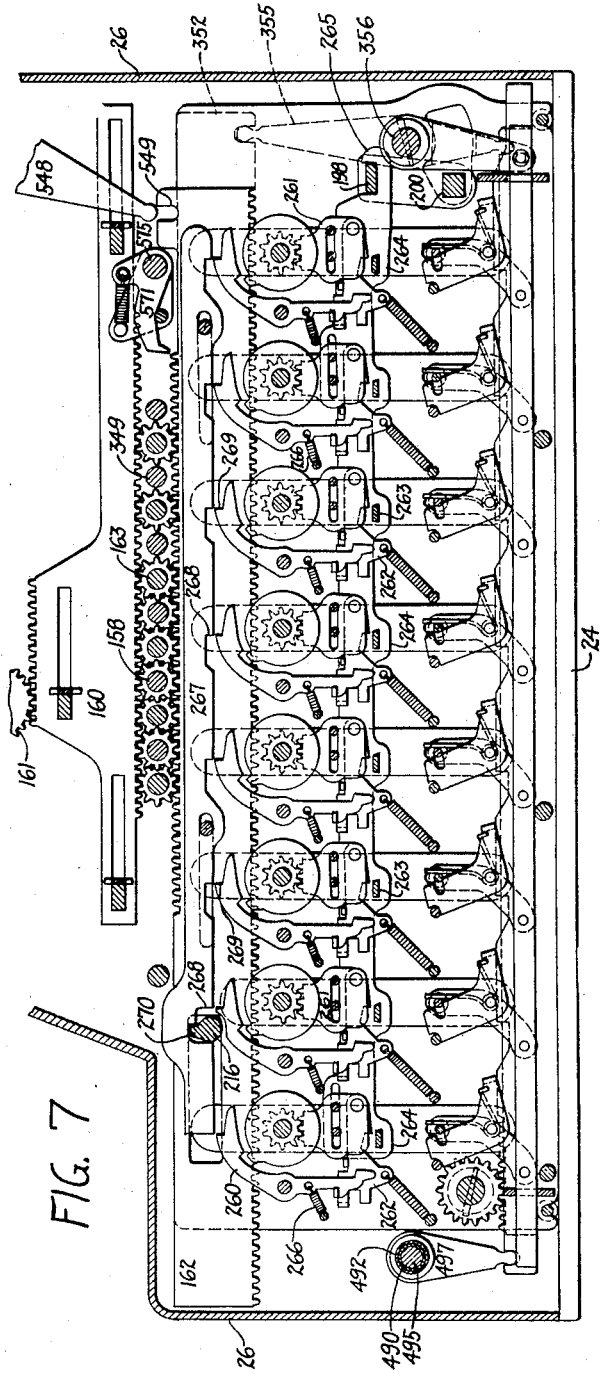
INVENTOR
WILLIAM S. GUBELMANN
BY
ATTORNEYS May 22, 1945.   W. S. GUBELMANN   2,376,481
ACCOUNTING MACHINE
Original Filed Jan. 22, 1929   8 Sheets-Sheet 6
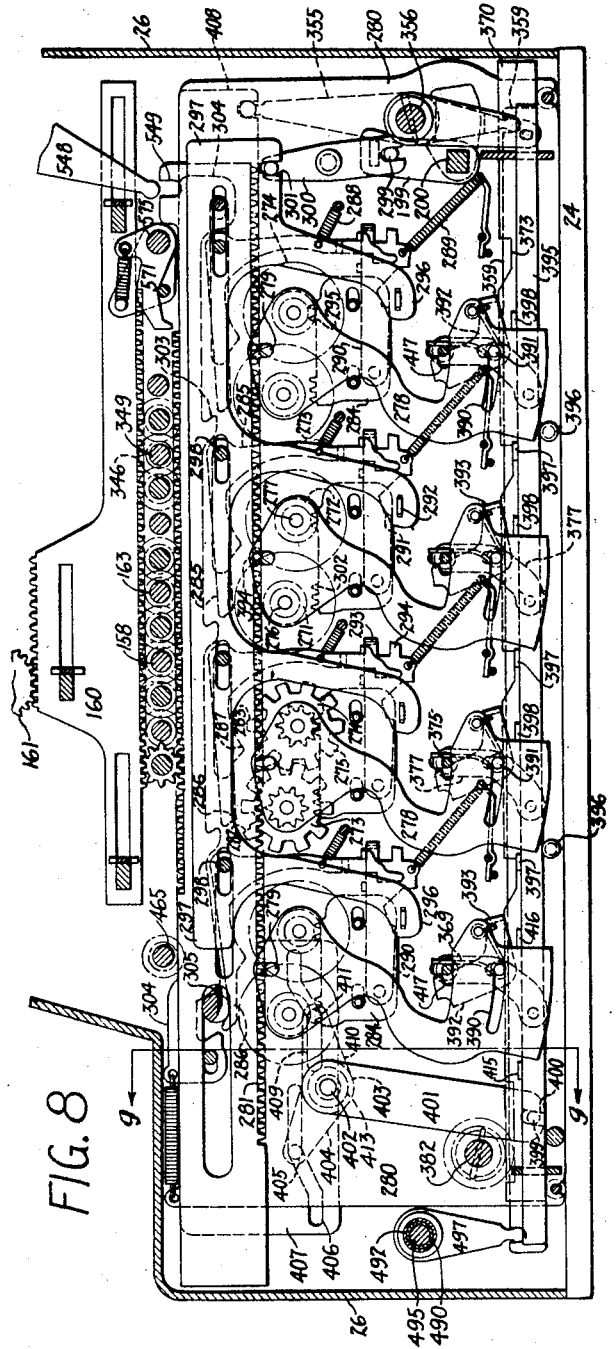
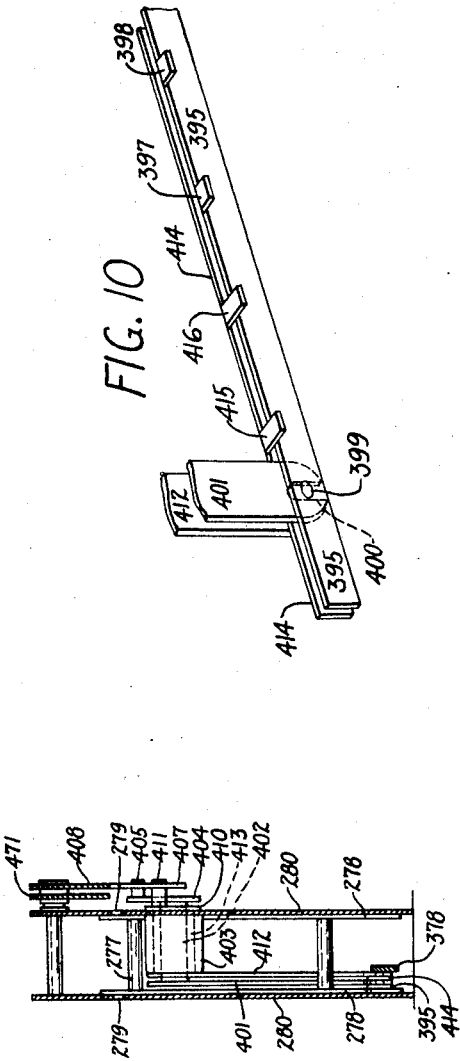
INVENTOR
WILLIAM S. GUBELMANN
BY
ATTORNEYS Patented May 22, 1945

2,376,481

UNITED STATES PATENT OFFICE 2,376,481

ACCOUNTING MACHINE

William S. Gubelmann, Convent, N. J.

Original application January 22, 1929, Serial No. 334,160. Divided and this application June 11, 1940, Serial No. 339,950

17 Claims. (Cl. 235—6)

This invention relates to accounting machines and particularly to totalizers for such machines and to improved tens transfer means therefor. this application being a division of applicant's application S. N. 334,160, filed January 22, 1929, Patent 2,226,919, December 31, 1940.

A primary object of the present invention is to improve the totalizer device of such machines and particularly the tens transfer devices therefor.

While the present invention may be employed with various types of accounting machines it is illustrated as applied to the cash register forming the illustrative embodiment of the invention of said application S. N. 334,160 to which reference is made for a more complete understanding of the invention.

The improved mechanism which applicant has devised is particularly suited for the inclusion of an unusually large number of totalizers in a single machine. In the illustrative machine, of Patent 2,226,919 three groups of selecting keys, including 27 keys in all, are adapted to variously select one or more of 43 totalizers upon each operation of the machine.

It is an important object of the present invention to so construct and arrange the totalizers as to permit the accumulation of a series of individual totals in accordance with several different classifications represented by the different groups of special selecting keys. In addition totalizers have been provided for the accumulation of grand totals of different combinations of these individual totals, or portions of such individual totals; while still other totalizers have been provided for maintaining a constant balance of certain factors of interest in connection with sales. For this latter purpose a plurality of adding and subtracting totalizers are included. The construction of this phase of the mechanism is such that in accordance with the combination of special keys depressed one or more of these adding and subtracting totalizers may be selected for operation either additively or subtractively while others remain neutral. The determination as to whether an item will be entered additively or subtractively in these totalizers is entirely automatic and the mechanism for accomplishing this result is effective in such a way that one totalizer may be added upon while the other is simultaneously subtracted from.

In view of the intended use of an usually large number of totalizers in the machine constructed in accordance with the present invention, it has been an important object to condense and simplify the transfer mechanism to such an extent that it will require an absolute minimum of space. Heretofore it has usually been necessary to arrange at least three, and frequently more, elements in separate planes to cooperate with each denominational order of a totalizer so that a totalizer of say ten orders has usually been of considerable width. By means of the present invention applicant has succeeded in condensing the space required by each order of the totalizer to two thicknesses of suitable metal which, for the sake of example, may be said to be fifty thousandths of an inch in thickness. Thus a totalizer of 10 orders constructed in this way will occupy a space, in width, of only one inch. Furthermore, the number of parts required for effecting the necessary carry from one order to the next has been materially reduced.

In order that the time interval allotted to the operation of carrying from the first to the last order of the totalizer may be reduced to a minimum, the transfer mechanism embodied in this machine is of the nines coupling type so that the carry into all orders of a totalizer that are to receive a transfer is effected simultaneously. The construction is such, furthermore, that separate actuators independent of the item entering racks are employed to effect transfers.

Under the arrangement and classification of the totalizers contemplated by the invention certain groups or rows of totalizers need only be active singly, whereas in other groups it is necessary that any number of the totalizers be operable at will, while in still another group it is necessary to be able at will to operate two or more totalizers either additively or subtractively. This has necessitated or made advisable the employment of various modifications of the transfer mechanism all of which embody certain common broad principles. In the development of the several modifications a maximum saving has been effected in the space required for each complete totalizer as well as for each group or row of totalizers. In these groups or rows in which only one totalizer need be operated at a time the transfer elements may in part, at least, be common to the same orders of the entire group; these may, therefore, be termed universal carry totalizers, while the other groups must comprise individual carry totalizers in which all of the elements are independent.

The particular form of applicant's totalizer selecting mechanism disclosed need not be fully described in this application as reference to Patent 2,226,919 may be had for that purpose.

An improved feature of the totalizer engaging mechanism is the positive action of the latter in moving the totalizers both into and out of mesh with the actuators. Another novel phase of the engaging mechanism disclosed herein is the provision of a double reciprocating movement of a selected totalizer toward and away from the actuators during each item entering operation. This double movement has been provided as an incident to the particular form of transfer mechanism employed and the mode of operation of the latter.

While an attempt has been made in the foregoing section to enumerate a number of the outstanding improved and novel features embodied in the present invention, it will be understood that many other features, too numerous to specifically mention at this point, are present and will become more apparent as the description of the illustrative devices progresses.

The following description relates to the attached drawings wherein—

Figure 4 is a view in side elevation, partly broken away, of a bank of universal totalizers with a related grand totalizer. For clearness one of the spacing frames has been removed.

Figure 5 is a vertical sectional view taken through a universal totalizer bank along the line 5—5 of Figure 4 and looking in the direction shown by the arrows.

Figure 6 is a view in rear elevation of a bank of universal totalizers.

Figure 7 is a view in side elevation of a bank of individual totalizers.

Figure 8 is a view in side elevation of a bank of adding and subtracting totalizers.

Figure 9 is a vertical sectional view showing the mechanism for determining addition or subtraction and is taken along the line 9—9 of Figure 8 looking in the direction indicated by the arrows, certain parts being omitted.

Figure 10 is a fragmentary perspective view showing the relative position of the arms and slides for determining addition and subtraction.

In the following description reference is made to numerals appearing on the drawings. Said drawings correspond to certain figures of the drawings of said Patent 2,226,919. The drawings contain certain numerals which are not referred to in the following description because they pertain to parts not deemed of importance in connection with the present invention. For a description of the parts indicated by said numerals reference may be had to said Patent 2,226,919.

Operating mechanism

Figure 1:
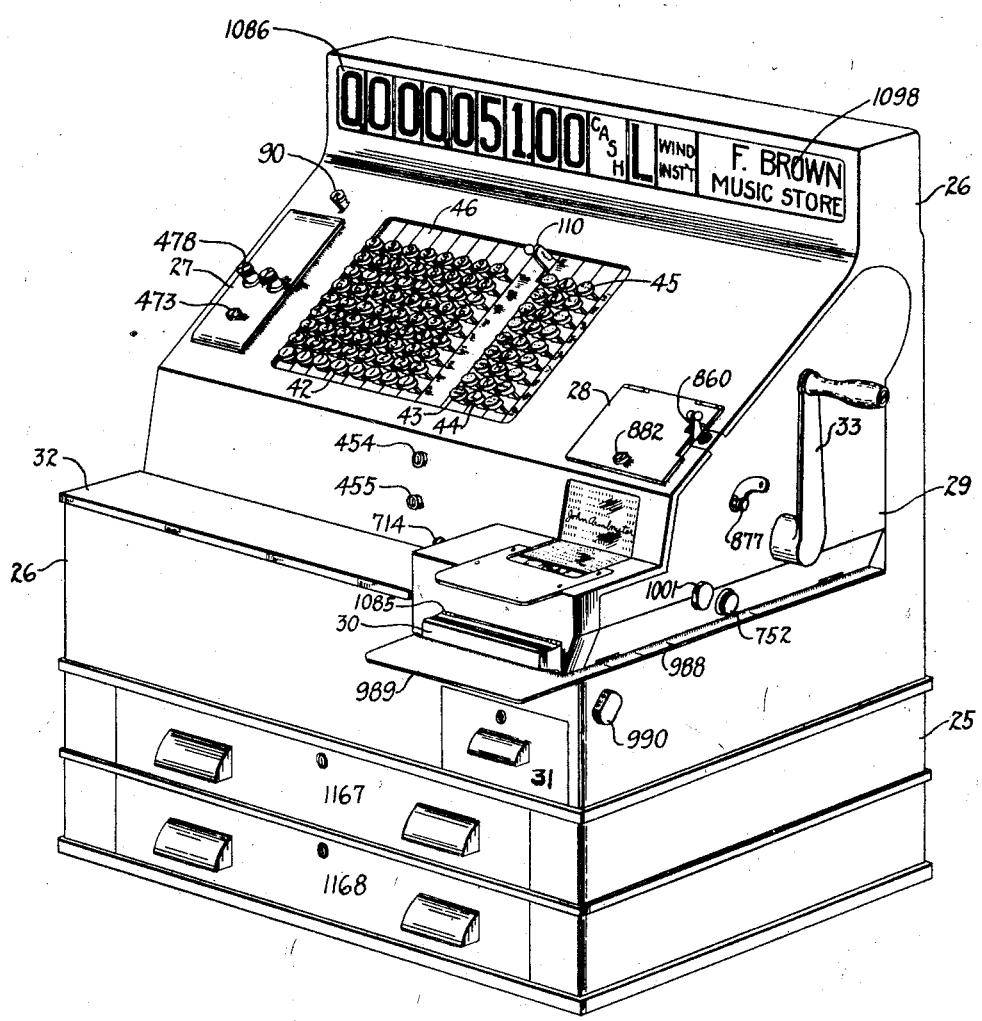
Figure 1 is a perspective view of a machine embodying the invention.

The machine illustrated is adapted to be driven by means of a hand crank 33, Fig. 1, although it will be understood that a motor may readily be provided to supply the motive power if desired. In actual use it will no doube be advisable to employ a motor, since the machine will necessarily require a fair amount of power for its operation. The crank 33 is suitably connected for driving the main shaft 37 which extends across the entire machine and serves to transmit the power to certain operating parts at intermediate points within the machine as well as to certain mechanism at the left hand side of the machine on the outer side of the left side frame. It is on this side of the machine that a gear thereon serves to drive an idler gear 39 which then transmits the power to a gear 40 which is coupled by means of a hub to a camming unit 506 to be described in greater detail hereinafter.

Keyboard and differential mechanism

As has already been mentioned, the machine disclosed is provided, as best shown in Fig. 1, with a number of banks of amount keys 42 which are sufficient to set up an amount up to $999,-999.99. There are also provided three banks of special keys such as transaction keys 43, clerks' keys 44, and department keys 45.

As the present invention relates to totalizers and tens transfer mechanism it is not deemed necessary to repeat here the full description of the keyboard, differential mechanism, totalizer selection mechanism, etc., which may be found in said Patent 2,226,919. It will suffice to state merely (referring to Fig. 2) that suitable manipulative means as keys 42 control a suitable differential mechanism which produces differential actuation of devices such as slides 160 which in turn through any suitable means, as parallel shafts 158, serve each to actuate a plurality of closely spaced totalizer actuators as 162 formed with rack teeth 174 (Fig. 4) with which the pinions of totalizers are engageable for operation.

As will be more fully explained in connection with the construction of the totalizers each order thereof is restricted to two thicknesses of relatively thin metal, say fifty thousandths of an inch thick. The actuators which are of the same thickness are spaced an amount substantially equal to their thickness. That is to say the group of actuators 162 that are related to one bank of totalizers will be separated from each other by only about fifty thousandths of an inch.

Totalizers

As has been stated hereinbefore the illustrative machine is equipped with forty-two totalizers of various constructions. Thirty of these totalizers are arranged in three separate similar banks each containing nine of what may be termed the universal transfer type and one of the individual transfer type. A detailed description of one of these banks will suffice for all and will now be given.

Referring particularly to Figs. 2, 4, 5, and 6, it will be seen that each of the nine universal totalizers consist of series of alternately arranged pinions 168 and larger single toothed disks 169 all mounted upon a short shaft 170. Each order of the totalizer consists of a pair of such elements suitably secured together as by pins, each element having preferably a thickness of about fifty thousandths of an inch and each order of the totalizer therefore requiring only one-tenth of an inch in width. A totalizer of ten orders may be condensed into a space of slightly over an inch in width. The pinions 168 are adapted to be moved into mesh with the teeth on the actuators 162 by means which will be later described. Normally these pinions are in engagement with teeth formed on transfer slides 171. The disks 169 which serve to control the transfer mechanism are of such size as to constantly overlap, to a certain extent, the adjacent actuators 162 and the transfer slides 171 regardless of the position of the totalizer and in this way the proper alinement of these parts is always insured. There can be no danger of misalinement and consequent difficulty in engaging the teeth of the pinions with the actuators. The shaft 170 of each totalizer is mounted in two side frames 172 and 173 as shown in Fig. 5 and these frames serve to aid in confining the elements to their proper positions.

Normally all of the totalizer elements are in the position shown in Fig. 4 in which the single teeth or projections 174 of the disks 169 are opposite notches 175 formed in the under edges of transfer tripping bars 176. These bars 176 are supported at their forward ends by means of a ball and socket connection with levers 177 which are in effect bell cranks pivoted at 178. At its rear end each of the bars 176 is supported by a ball and socket connection with a bell crank 179 pivoted at 180. The pivot rods 178 and 180 are fixed and pass through elongated slots 181 and 182 in the actuators to permit the necessary nine steps of movement of the latter. At the lower ends of the downwardly extending arms of the lever 177 and the bell crank 179 there is carried, preferably by means of ball and socket connections, a bar 183 which serves to complete the parallelogram consisting of the bars 176 and 183 and the arms 177 and 179. This construction is such that if any one of the nine universal totalizers is in mesh with the actuators and the projection 174 of one of the disks 169 is carried nine steps, from the normal position shown (Fig. 4) in a counterclockwise direction it will strike the under surface 184 of the related bar 176 and will cam the latter upwardly. Due to the closed link construction the bar 176 can only move up in such a way as to maintain its horizontal position. As the bar 176 is lifted the arms 177 and 179 will be rocked clockwise to a certain extent and the bar 183 will be shifted to the left (Fig. 4) in opposition to a spring 185 (Fig. 2) which is connected at one end to the bar 183 at one or another of a pair of tabs 186 and 187 and at its opposite end to one or the other of the lugs 188 and 189 formed on the related transfer slide 171. These springs 185 are arranged alternately, front and rear, from order to order to enable the use of a stronger spring than could otherwise be employed.

Figure 3:
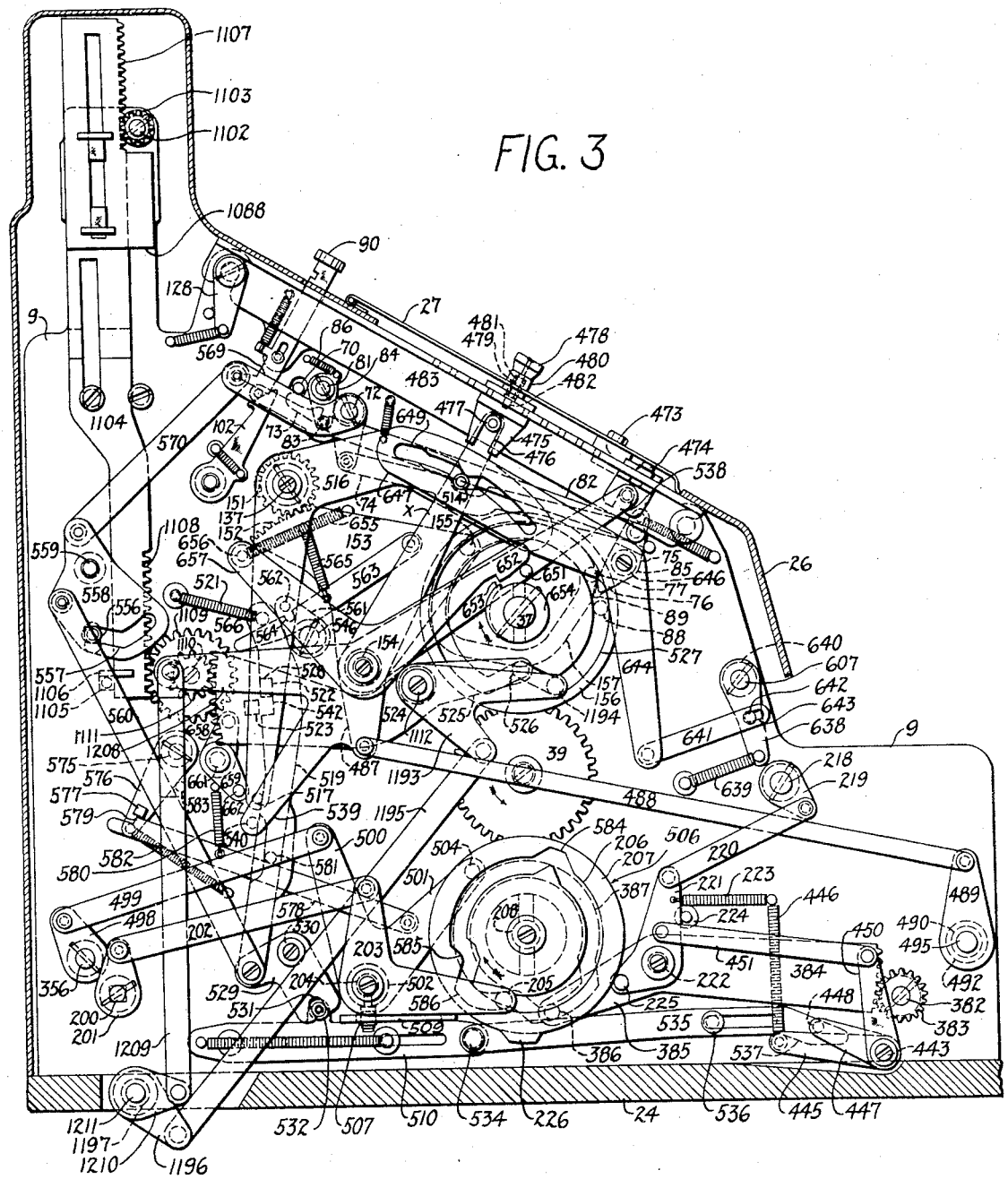
Figure 3 is a side elevation of the machine showing the control mechanism mounted on the left side frame of the machine.
Figure 11:
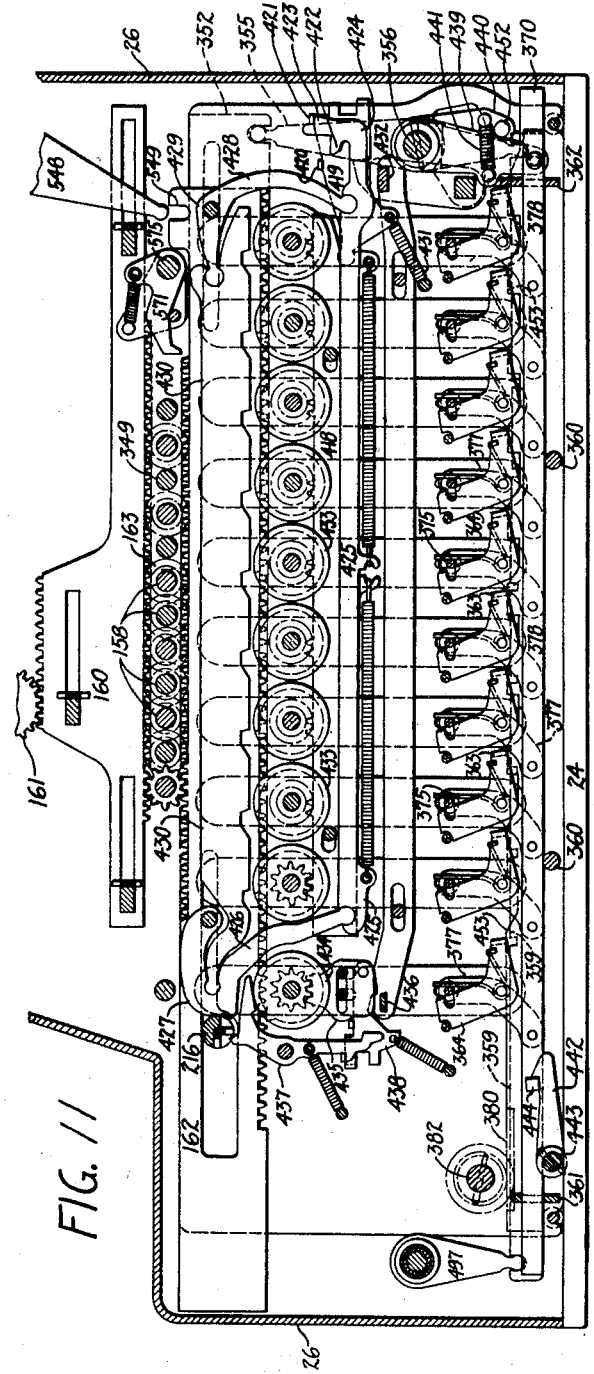
Figure 11 is a vertical sectional view of a bank of item counters.

An extension 190 of the bar 183 is provided with a pair of shoulders 191 and 192. Normally the shoulder 192 is under a lug 193 formed as an overturned tab on a plate 194 which is pivotally connected, as by a ball and socket connection, to the transfer slide 171. A spring 195 connected between a trunnion 196 and an extension of the plate 194 tends to rock the latter clockwise thus holding the lug 193 in engagement with the shoulder 192. Also when the bar 183 is shifted to the left, as explained, upon lifting of the trip bar 176 by the projection 174 so that the shoulder 192 is disengaged from the lug 193 the spring 195 will rock the plate 194 until another overturned lug 197 thereon engages the shoulder 191 which at this time is carried under the lug. Now if the disk 169 is rotated still further until the projection 174 is carried beyond the surface 184 of the bar 176 so that the latter may drop again, the bar 183 will be shifted to the right again by the spring 185 and the shoulder 191 will be carried away from the lug 197. The spring 195 may then rock the plate 194 still further until the edge of a cut-out portion of the plate engages a movable cross bar 198. Assuming that one of the plates 194 has been thus rocked to engage the cross bar 198 during the movement of the actuators 162, the totalizer pinions 168 will then be lowered out of mesh with the actuators and into engagement with the transfer slides 171 by the mechanism which will later be described. At this time the bar 198 will be oscillated by first imparting to it a movement to the right in Fig. 4 and then to the left beyond the normal position shown and finally to the right into the position shown. The means for so moving the bar comprises a pair of arms 199 in which the cross bar is secured to form a bail. The arms 199 are formed with square openings which surround a squared shaft 200. Referring now to Fig. 3 it will be seen that the shaft 200 has secured thereto at its left end an arm 201 to which is connected a link 202. At its forward end this link is connected to one arm of a bell crank 203 loosely pivoted on a stud 204. A roller 205 carried by the other arm of the bell crank is adapted to follow a suitable cam groove 206 in a box cam 207 forming part of the cam unit mounted on a stud 208 and connected to the driven gear 40. The groove 206 is properly shaped to provide for the movement of the parts as explained.

Returning now to the cross-bar (Figs. 4 and 6) 198 the movement to the right under the conditions assumed will cause it to engage a shoulder 209 on the plate 194 which has been dropped into engagement with it. This will cause the transfer slide 171, which is connected to the plate, to shift to the right and enter a unit into the totalizer wheel of next higher order from that which carried the projection 174 that controlled this transfer. Movement of the cross-bar to the left will permit the springs 185 and 195 to restore the slide 171 to the left and continued movement of the cross-bar in this direction will cause it to engage a cam surface 210 of the plate 194 which has been active and will raise it until the lug 193 is carried above the shoulder 192. Upon completing the movement of the cross-bar to return it to normal the spring 195 will settle the plate 194 back to its normal position as well. If springs 185 were not provided or did not function properly the cross-bar would cooperate with a shoulder 211 to restore the latter and the slide 171 toward the left.

It will be obvious that several of the plates 194 related to a particular bank may have been dropped into engagement with the cross-bar by passage of several wheels through zero and in this event all will be operated simultaneously by the cross-bar. This simultaneous action gives rise to the need for a special provision in the event that a wheel should be standing at nine at the time that it receives a transfer movement. Passage of such a wheel to zero will come too late to permit it to drop the next higher plate 194 on to the cross-bar 198. However, by virtue of the fact that such a wheel stands at nine under the conditions assumed its projection 174 will have raised the trip bar 176 and will have shifted the bar 183 to the left so that the next higher order plate 194 will have dropped until its lug 197 engages the shoulder 191. Each plate, furthermore, is provided with a straight projection 212 and an inclined overturned finger 213. Normally each of the latter overlaps the adjacent finger on the right as shown in the rear view (Fig. 6). So also if any adjacent plates have been dropped into their "nine" positions the higher order plate will have its finger 213 in the path of the next lower order plate. Assuming now that the next lower plate beyond the adjacent plates considered has been dropped fully, by the passage of a wheel to the zero position or beyond, its projection 212 will have dropped to a position just below the normal plane of the fingers 213 and will be alined with the next higher finger 213 that has been partly dropped. All three of the plates under consideration will then be simultaneously shifted upon the positive driving of the fully dropped plate by the bar 198 to effect a carry in the three orders. For this purpose the projection 212 of the fully dropped plate will engage the finger 213 of the adjacent partially dropped plate and its movement in turn will be transmitted to the finger 213 of the still higher partially dropped plate. Thus all transfers that are to be effected during an operation of the machine will occur simultaneously and will take place not only in these orders wherein the plate 194 has been engaged with the cross-bar 198 but also in those orders wherein the plates have been dropped one step by virtue of the fact that the next lower wheel stands at nine and where this lower order in turn has its plate dropped fully into engagement with the cross-bar. Any of the plates which are in their normal positions at the beginning of a transfer operation can under no condition receive a transferring movement, and those which have been partly dropped will only be operated if they are coupled directly to a plate that has been fully dropped or indirectly coupled to such plate through another partly dropped plate. It is to be noted that the upturned end 190 of the bar 183 is so formed that it will not interfere with the movement of the lug 197 whether it is in the nine position or the fully dropped position. For this purpose the shoulder 191 is of extra length to permit this movement when the plate is in the nine position while a notch 214 below this shoulder permits movement of the plate when it is in the fully dropped position.

Another detail of this construction which should be mentioned is that the projection 212 is slightly rounded on the end so that it may have a camming effect upon the next higher plate finger as the plate carrying the projection drops all of the way to the cross-bar. Preferably the curvature of the end is in the form of an arc having the pivot of the plate as a center. This will merely cam the finger of the next plate slightly against the tension of springs 185 and 195 and the movement is so slight as to be practically negligible. The purpose of this feature is to insure direct contact between the projections and fingers when they cooperate so as to avoid any lost motion in transmitting the movement of the cross-bar from one to the next.

A further point which should be observed is that if a wheel stands at nine when it is being moved up into mesh with the actuators its projection 174 will raise the trip bar 176 just as when the wheel is turned to nine after it is in mesh.

Suppose now a wheel is in the nine position so that its projection 174 is holding the trip bar elevated just prior to the movement of the totalizer out of mesh with the actuators, if no means were provided to prevent it, the trip bar would drop as the totalizer is lowered and the bar 183 would be shifted to permit the full dropping of the plate 194 just as if the wheel had passed on to zero or beyond. For this reason there is provided a projection 215 on the lever 177 with which cooperates an angle member 216 which is turned counter-clockwise about 60° just before the totalizers are lowered. If the trip bar is in normal position the leg 217 of the angle member will pass over the projection 215 and prevent accidental raising of the trip bar, but if the bar is held raised at this time by the transfer tooth the angle member will engage the underside of the projection and hold the bar up even though the totalizer is lowered and the transfer tooth is withdrawn.

The angle member 216 extends across a considerable portion of the width of the machine having different forms at different points so as to cooperate with all of the groups of totalizers and at its ends it assumes the form of a solid shaft to serve as circular bearing portions 218. At its left end the shaft portion 218, as best shown in Fig. 3, has secured thereto an arm 219 which is connected by a link 220 to a bell crank 221 pivoted on a stud 222 and normally urged by a spring 223 against a stud 224. A roller 225 carried by the other arm of the bell crank is in the path of a cam projection 226 forming a part of the beforementioned cam unit 207. The cam projection 226 is so located and is of such length that it will turn the angle member just before the totalizers are lowered and hold it turned throughout the active transfer operation.

Due to the fact that only a single trip bar 176, and a single transfer slide 171 and related parts are provided for the same order of all nine of the universal totalizers in a bank, it will be apparent that only one of these totalizers may be active at a time since otherwise there would be a conflict in the control of the transfer members for a particular denominational order. This is the reason for the designation "universal" as applied to these totalizers since most of the transfer mechanism is common to them all.

It may appear from what has been described that an erroneous carry will be effected in all of the inactive totalizers in those orders in which the active totalizer receives its transfers. This is not the case however, as will be clear from the following explanation. When a transfer slide 171 is shifted to the right (Fig. 4) to effect a carry in an order of the active totalizer it will simultaneously operate all of the same orders of the inactive totalizers as well but the unit which is thus added will be immediately withdrawn from these inactive totalizers upon the restoration of the transfer slide to its normal position. The active totalizer, however, will not partake of this subtractive or return movement of the transfer slide due to the fact that it will be raised out of engagement with the latter prior to the movement of the cross-bar 198 toward the left (Fig. 4). The mechanism for bringing about this movement of the active totalizer will be explained hereinafter in connection with the totalizer engaging mechanism.

Grand totalizer for universal bank

As already mentioned, each bank of universal totalizers is provided with a grand totalizer which may be operated each time that any one of the universal totalizers of the bank is operated. For this purpose it is necessary to provide a separately controlled transfer mechanism for this totalizer since the carrying between its wheels must take place at different times from the carrying in the universal totalizers. Spaced frame members 231 and 232 are provided for supporting the various elements of the totalizer. The construction of the totalizer elements themselves is the same as already explained, that is, each order consists of a pinion 168 and a larger disk 241 having a single projection 227 similar to the projections 174. Normally this projection stands in the position shown in Fig. 4 in which it is opposite a cut-out portion 228 of an arm 229 of a two-armed member pivoted on a rod 230 carried by the plates 239 and 240 which serve as the totalizer frame. A downwardly extending arm 233 of the two-armed member is provided with a shoulder 234 which cooperates with an overturned lug 235 formed on a plate 236 which is somewhat similar to the plate 194. This plate is pivotally mounted on a slidable rack plate 237 mounted on cross rods 238 carried by the spacing frames 239 and 240 this rack having teeth which are normally in engagement with the teeth of the pinion of the next higher order than that whose disk controls the arms 229 and 233. As shown, the arm 233 is bent or offset to bring it into the proper plane this being necessitated by the fact that each order consists of only two thicknesses of metal. The upper arm 229 must be in the plane of the disk 241 of a lower order while the lower arm 233 must be in the plane of the lugs on the plate 236 and these lugs are in the plane of the rack 237 and the pinion 168 of the next higher order. A spring 242 urges the arm 233 in a clockwise direction until arrested by engagement with the lug 235 another spring 243 connected to the plate 236 urges it down and toward the left to hold it as well as the rack 237 in the normal position shown in Fig. 4. The action of this mechanism is quite similar to that of the mechanism related to the universal totalizers although it will be observed that the arrangement of the plate 236 is about the reverse of the arrangement of the plate 194 connected to the universal transfer slide 171. The operation is as follows: whenever the projection 227 is carried into the nine position it will engage a surface 244 of the arm 229 and rock the two-armed member to disengage the shoulder 234 from the lug 235. Spring 243 will then rock the plate 236 counter-clockwise until another lug 245 thereon engages another shoulder 246 on the arm 233. This is not sufficient to carry a shoulder 247 on the plate in rear of a cross-bar 248 but is merely enough to carry the point 249 of this shoulder to a position on a horizontal line with the upper surface of the cross-bar. Now if the projection 227 passes to the zero position or beyond, the spring 242 will rock the two-armed member to carry the shoulder 246 away from the lug 245 and will permit the plate 236 to drop still further until the surface 250 rests on the cross-bar 248 and the shoulder 247 is in the path of the latter. The cross-bar is carried by a pair of slides 251 which are mounted by means of elongated slots 252 on studs 253 carried by the guide frames 239 and 240, and are connected at their rear ends to the cross-bar 198 which operates the universal transfer slides. It will therefore be apparent that the bar 248 will partake of the same movements as explained in connection with the universal cross-bar 198.

Each plate 236 has an upper inclined overturned finger 254 (similar to fingers 213 on plate 194 previously described) and a projection 255 beneath it. Normally all of the fingers 254 are coupled in series so that each lower order plate if moved would carry with it the next higher order. When all of the plates are at normal none of them will be coupled to the bar 248 so that none will be moved. Assuming, however, that the plate controlled by the units order and connected with the dimes transfer slide has been fully coupled to the bar 248, then its finger 254 will have dropped to a position below the normal position of the projection 255 of the next higher order plate. Now if this next higher order plate is dropped one step to the nines coupling position its projection 255 will be carried into the path of the finger 254 of the fully coupled plate. Should the tens of dollars plate or that next above the first nines coupled plate be also dropped to the nines coupling position its finger 254 will be carried into the path of the finger of the first nines coupled plate. Therefore, when the bar 248 is shifted to the right it will directly carry the dimes plate 236 and the finger 254 of the latter will engage the projection 255 of the dollars plate to shift it, while the finger of this plate will engage the corresponding finger of the tens of dollars plate so that all three plates will be simultaneously shifted. As the tens of dollars plate is shifted its overturned finger will merely enter the notch 256 between the projection and finger of the hundreds of dollars plate.

On the return movement of the cross-bar 248 toward the left it will be understood that the shifted plates are all returned either by their springs 243 or by the positive action of the bar on the surfaces 257 and at the same time this coaction will serve to lift the plates until the lugs 235 clear the shoulders 234 and the springs 242 are permitted to restore all of the arms 233 to normal. Cross-bar 248 is then shifted slightly to the right into normal position again.

The angularly grooved member 216 which serves to hold the universal transfer elements in nines coupled position serves also to hold the arms 229 in such position upon downward movement of the totalizer wheels. Thus a shoulder 258 of the angle member will cooperate with one side or the other of projections 259 of the arms 229 depending on whether the latter are rocked or in normal position. It should be noted that the actuating racks 182 are slotted suitably to permit a free sliding movement clear of the angle member 216 and on the supporting rods 178 and 180.

Bank of individual totalizers

Adjacent the left hand one of the three banks of universal totalizers, each of which is provided with a single grand totalizer as above explained, there is provided a bank of eight individual totalizers (Fig. 7). These are of substantially the same construction as the grand totalizers of the universal banks and are so arranged that any number of them may be operated at one time. The construction and mounting of the totalizer wheels and their relation to the transfer levers 260 is precisely the same as for the grand totalizers of the universal banks. So also the form of transfer racks 261 and connected coupling plates 262 is precisely the same as the equivalent parts for the grand totalizers and their mode of operation has already been fully set forth. The cross bars or bails 263, for all of the eight totalizers, adapted to effect carries in the proper orders of the latter are mounted in a single slidable frame comprising two side members 264 between which these bars extend. A hook 265 at the right end of one or both of these side members is adapted to engage the cross-bar 198 which is carried by the squared shaft 200. As explained, this shaft has the properly timed rocking movement to effect transfers and to then restore the plates 262 and other parts. For the purpose of holding the levers 260 in their rocked positions when the related wheels have been turned to and left in the nine positions and for preventing these levers from rocking clockwise again under influence of springs 266 as the totalizers are lowered out of mesh with the actuators there is provided a series of slides 267, one for each denominational order, having suitable shoulders 268 to cooperate with shoulders 269 on the levers. The member 216 is turned at the proper time as already explained and by means of camming portion 270 thereon will shift the slides 267 to the left to effect the desired result.

Adding and subtracting totalizers

The extreme left hand bank of totalizers (see Fig. 8) comprises a series of four units capable of both addition and subtraction. The means for determining the nature of an operation, i. e., whether addition or subtraction, is controlled by any suitable means under control of the bank of transaction keys. It is a particular feature of the present invention to provide a totalizer of this type which has each of its orders confined to two thicknesses of metal just as for the simple adding totalizers.

Referring to Fig. 8 it will be noted that each totalizer of this group comprises two sets of pinions 271 and 272 and larger toothed disks 273 and 274. Each order of a totalizer is composed of a pair of the pinions to which are secured the larger disks which in turn are intermeshed by means of large teeth 275 so that turning of either pinion will cause turning of the other. The construction is such that either set of pinions 271 or 272 may be carried into mesh with the actuating racks during the return movement of the latter to either add or subtract an amount. For this purpose the pinions 271 and disks 273 are loosely mounted on a shaft 276 while pinion 272 and disks 274 are loosely mounted on a shaft 277 and these two shafts are supported by a pair of rock plates 278 (Fig. 9) pivoted at 279 by studs carried by the plates and coacting with elongated slots in the intermediate supporting frames 280. The plates 278 are adapted to be lifted slightly when either in the position shown in Fig. 8 or when rocked counter-clockwise to change the relation between the pinions 271 and 272 and the actuators. If the plate is raised when in the position shown the pinions 271 will be carried into mesh with the racks 281 and addition will follow whereas when the plate is rocked and then raised the pinions 272 will be carried into mesh with the actuators and subtraction will follow. The large disks 273 and 274 not only serve to intergear the pinions 271 and 272 but carry extra long teeth 282 and 283 for the purpose of controlling transfers.

A set of transfer racks 284 is provided for each of the adding and subtracting totalizers so that transfers may be effected independently in each. Normally the subtracting pinions 272 are in mesh with these racks but they are carried out of mesh whenever the adding totalizer wheels 271 are raised to mesh them with the actuators. Also when the plates 278 are rocked the pinions 272 are carried out of mesh and the adding pinions are carried into mesh with the transfer racks until the totalizer is raised to mesh the subtracting wheels with the actuators.

The general principle of operation of the transfer mechanism for this group of totalizers is precisely the same as for the individual type of totalizer before described. Thus, for each order with the exception of the highest order wheel of each of these totalizers there is provided a lever 285 adapted to have its horizontal arm cooperate with a long tooth 282 on the large gear 273 or a similar tooth 283 on the corresponding large subtracting gear 274. For this purpose the surface 286 on each arm is adapted to be cammed by the tooth 282 whenever the adding wheels are active and the related one is turned into the nine position. Similarly the surface 287 is adapted to be cammed by the tooth 283 of the subtracting wheel when it is in mesh with the actuator and is being turned into its nine position. When either of these wheels, which happens to be active, is carried to or beyond its zero position the arm will again drop under influence of a spring 288. Rocking of the lever 285 by either wheel as explained will permit a spring 289 to lower the next higher plate 290 either one step or three steps according to whether the wheel has passed to the nine position or to or beyond the zero position. If the plate is dropped only one step the point of the shoulder 291 is brought just above the plane of the upper surface of the crossbail 292. If the plate is dropped three steps the shoulder will be brought completely into the path of the bail 292. Just as for the individual totalizers the plates 290 are provided with overturned fingers 293 and projections 294 so that when a lower order plate is fully dropped and a next higher plate is dropped a single step its projection 294 will be in line with and to the left of the finger 293 of the lower plate. Movement of the bail 292 toward the left will therefore shift the lower order plate and through the finger and projection will also shift the next higher plate to the left (Fig. 8). Furthermore if the next still higher order plate is dropped one step its finger 293 will be in line with the finger of the first mentioned higher order plate so that all three plates would be shifted simultaneously, and so on.

The plates 290 are pivotally secured as by pins to the slidably mounted transfer racks 284 so that upon shifting of the plates the racks will be shifted and by engagement of the teeth 295 with the pinions 272 a unit will be added to the adding wheels, assuming that these have been active. In this connection it is to be noted that the unit is transmitted to the pinions 271 through the large disks 273 and 274 and the subtracting wheels 272 which act as idlers so that the movement of the transfer racks and hence the bails 292 is required to be in the opposite direction from that of the other banks of totalizers described. For this purpose the bails are mounted in downwardly extending arms 296 depending from two slide bars 297 which thus form a sliding frame mounted on rods 298 which support the levers 285. Movement of this frame to shift the bails first to the left, then to the right beyond normal to restore the plates 290, and finally to the left to normal position is effected by the squared shaft 200 through a pin and slot connection 299 between the arm 199 and a lever 300 whose upper end engages in a notch 301 in one of the slide bars of the frame.

If subtraction is being effected the teeth 302 of the actuated transfer racks will directly engage the adding wheels and turn them a unit subtractively. In the foregoing discussion mention has been made of the nine position and the zero position of the subtracting wheel 274. It is to be understood that this refers to the relative position of the long tooth 283 of this wheel to the shoulder at the left of the surface 287 on the transfer lever. This relation is such that when the tooth is nine steps from the shoulder so that the wheel is said to be in the nine position the corresponding adding wheel will be in the zero position. When the subtracting wheel is in its zero position, on the other hand, the adding wheel will be in the nine position and so for all positions of the two related wheels the one will represent the nine's complement of the other.

In order to hold a transfer lever 285 which has been moved to the nine position and prevent its following the downward movement of the totalizer as the latter is moved out of mesh with the actuators the extreme ends of the horizontal arms of the levers are adapted to cooperate with hooks 303 formed on slides 304. The latter are adapted to be shifted at the proper time by the camming portion 305 of the previously described shaft or member 216. Any of the levers 285 which have been rocked will thus be held in the nine position while the remaining levers for all four totalizers will be held in their normal positions as long as the shaft 216 remains rocked.

The means for determining the positions of the several plates 278 to control the condition of the totalizers in this bank, as to whether they are to receive additive or subtractive amounts, as well as the means for controlling the movements of the totalizers into and out of mesh with the actuators will be described later.

Special key banks

For the purpose of selecting totalizers for actuation a group of slides 370, 496, 486, 359, and 472 are provided (Figs. 4, 5, 6, and 11) in as many of the banks of totalizers as desired, to determine which, if any, of the totalizers in each group shall be active.

Referring now particularly to Figs. 4, 5, and 6 the means whereby the slide bars 351, 352, and 353 serve to determine or control, in conjunction with other elements, the selection of totalizers will now be described. Toward the rear end of each bar on its under side there is provided a notch 354 (Fig. 4) which serves as a socket for the upper end of a lever 355 loosely mounted on a cross shaft 356. A downwardly extending arm 357 of the lever 355 is bent to pass through a hole 366 in the frame 239, and has its lower end fitted into a socket 358 in the upper edge of a slide bar 359 mounted on supporting rods 360 and combs 361 and 362 (see also Fig. 11). The slide bar 359 is cut away in places and is left in its full height at other points so that either a notch or a solid portion of its upper edge may be brought into the path of a crossfinger 363 of a pivoted plate or bail 364 related to each totalizer in the bank with which the particular slide bar cooperates. As will presently appear if a notch 365 in the bar presents itself to a crossfinger 363 after the bar has been shifted under control of its special key bank then the related totalizer will be selected, whereas if a projection or solid portion of the bar presents itself to such finger, the related totalizer will not be selected.

The bail 364 is pivotally mounted on pins 367 and 368 extending from the supporting frame plates 172 and 173 for each universal totalizer and it is normally urged in a clockwise direction (Fig. 4) by means of a spring 369. Movement of the bail 364 in this way, however, is normally prevented by means of a slide bar 370 whose upper edge normally stands under the finger 363 and holds the bail with a shoulder 371 against a fixed rod 372 carried by the spacing plates 239 and 240. At the appropriate time in the operation of the machine, however, the bar 370 is forced to the left (Fig. 4) by means which will be described and a cutaway portion 373 will be presented below each of the fingers 363 of the several bails 364 for the totalizers in the bank. Now if a notch in the bar 359 happens to be positioned below the finger 363 of a particular bail the spring 369 will rock the bail until a notch 374 toward its upper end engages a rod 375 which is slidably supported between the two spacing plates 239 and 240 in slots 376 and passes through similar slots in the two totalizer frame plates 172 and 173. This rod is adapted to be raised a slight distance, and this is the reason for its being mounted in the elongated vertical slots 376. The rod passes freely through these elongated slots in the two totalizer frame plates and is held against longitudinal movement by engagement of its shouldered ends with the spacing plates 239 and 240 as best shown in Fig. 5. At the appropriate point in the operation of the machine all of the rods 375 will be elevated and those bails 364 which have been rocked to engage the notches 374 with their rods will also be raised. Since the bails 364 are pivoted on the totalizer frames the latter will be raised also and the totalizer pinions 168 will be carried into mesh with the actuating racks. Of course any bail 364 which has not been rocked by virtue of the fact that the finger 363 has encountered a solid portion of the bar 359 will not be raised and it, as well as the related totalizer, will be held against accidental lifting by cooperation of shoulder 371 with the rod 372. It is to be noted that when the bar 370 is shifted to the left even such a bail will be rocked slightly but not to a sufficient extent to engage the notch 374 with the rod 375 or to disengage the shoulder 371 from the rod 372.

The means for raising the several rods 375 at the appropriate time comprises a series of toggle links 377 each of which is connected at one end to one of the rods and all of which are connected at their opposite ends to a slide bar 378. At the appropriate time, namely after the actuators have been differentially positioned during adding operations, the bar 378 is shifted to the right (Fig. 4) with the result that all of the toggle links will be straightened out to a more nearly vertical position. This will cause the rods 375 to be raised in the guide slots of the division plates and any of the bails 364 which have their notches 374 engaged with these rods will be lifted and will carry their related totalizers into mesh with the actuators. The means for shifting the bar 378 in the manner indicated comprises an arm 379 which is secured to the shaft 356 and which is connected, as by a pin, at its lower end to the bar. The system of levers, links and cams for rocking the shaft 356 at the appropriate time to give the proper movement to the bar 378 will be described in a later section, suffice it to say at this point that the timing of this operation varies in accordance with the nature of the operation, i. e., whether adding, totaling, or sub-totaling. It will be understood that movement of the bar in the reverse direction, i. e., to the left in Fig. 4, serves to lower the rods 375 and withdraw the totalizers which were previously raised.

It is important to note in connection with the foregoing that in those banks of totalizers where several of the notched bars 359 are provided it is necessary that a notch in each of them be presented beneath the finger of a bail 364 related to a particular totalizer in order to cause the engagement of that totalizer with the actuators. Thus for the bank of eight individual carry totalizers there will be a notched bar under the control of the transaction bank of keys and another under the control of the department bank of keys. Obviously if either of these bars should be so positioned as to present its high upper edge or a projection to the finger of a particular bail the spring 369 acting on the bail could not engage the notch 374 with the rod 375. Notches 365 in all bars must be alined to permit rocking of the bail 364. As will be more fully explained hereinafter there are other bars, similar to those controlled by the several banks of special keys, provided for the various banks of totalizers and those must likewise have a notch alined with a particular finger 363 to permit engagement of the related totalizer. These additional bars are under the control of certain cashiers' locks and the total controlling devices.

Figure 2:
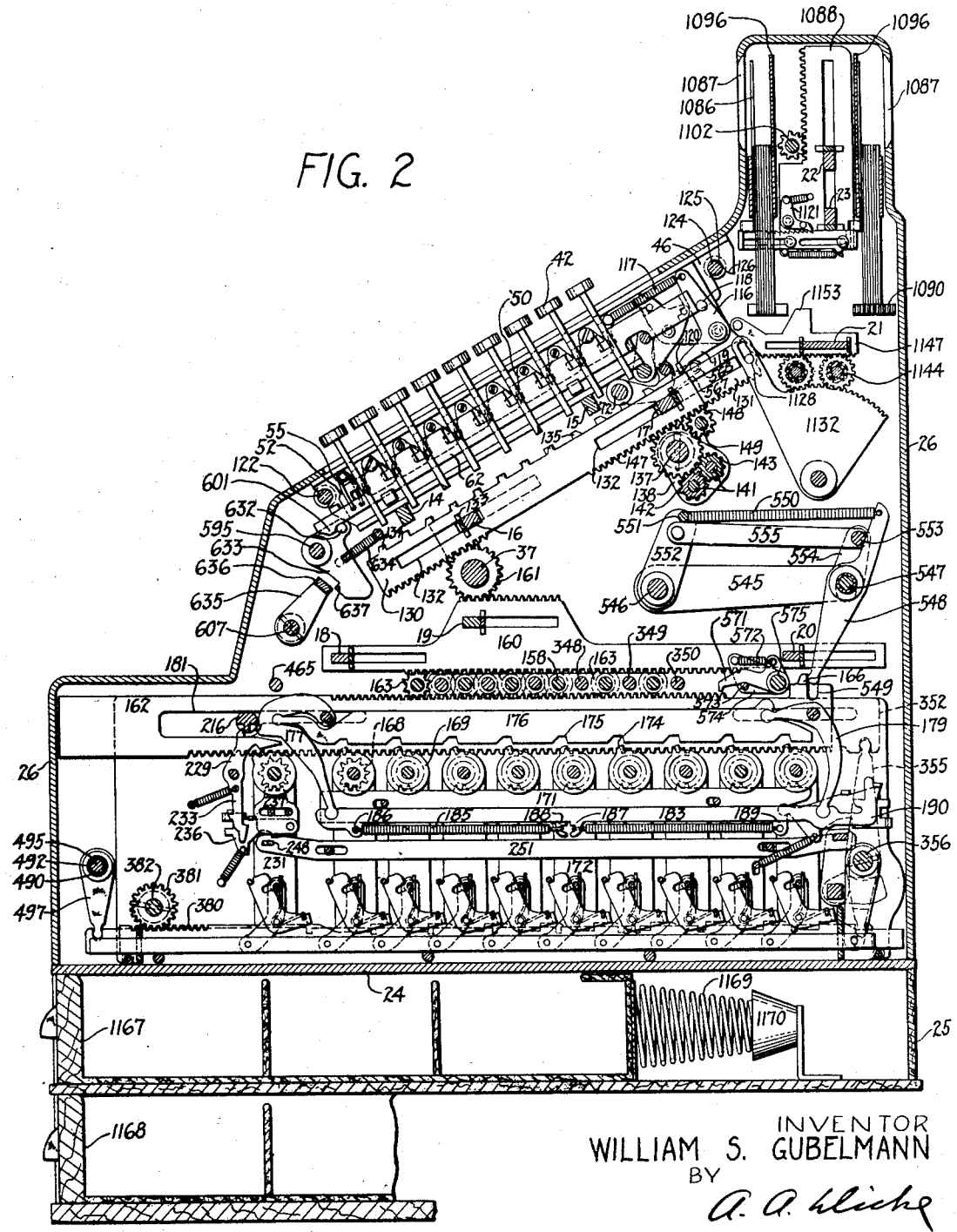
Figure 2 is a vertical sectional view through the machine, showing the differential mechanism, a bank of universal totalizers and actuating mechanism therefor.

Returning to the bar 370 which as stated is for the purpose of normally holding all of the bails 364 in rocked position and which is shifted to the left (Fig. 4) at the proper time to permit the bails to be rocked provided that notches 365 in all of the controlling bars are alined beneath the fingers 363 of these bails, it will be noted that it is provided on its forward upper edge with a series of rack teeth 380 (Fig. 2). These are adapted to mesh with a pinion 381 secured to a shaft 382 which as shown in Fig. 3 has secured thereto outside the left side frame a pinion 383. This pinion meshes with a segment 384 pivoted at 222 and provided with a rearwardly extending arm 385 carrying a roller 386 which rides in the raceway 387 of the cam 207. The timing of the raceway 387 in this cam is such as to permit the necessary movements of the totalizers during all operations and for this purpose the cam holds the bar in the normal position shown during about the first 30° of movement of cam 207 and then shifts the bar and retains it in shifted position until very near the end of the operation of the machine. It will be noted that the upper edge of bar 370 (Fig. 4) is slightly above the upper edges of the selecting bars 359 so that normally the fingers 363 are held high enough to permit free movement of the selecting bars. Furthermore, the cam formation of the surfaces 388 of the bar 370 renders them effective on the return of the bar toward the right (Fig. 4) to return the bails 364 to their normal inactive position.

It should be understood that the construction of the totalizer selecting and engaging mechanism is precisely the same for all of the banks of adding totalizers and the counters. The several banks differ one from the other only in that the number of selecting bars 359 may vary and the arrangement of the notches in these bars will necessarily differ.

*Selection and control of adding and subtracting totalizers*

It is necessary with respect to the Adding and Subtracting bank of totalizers to determine not only which of the totalizers shall be active but also whether they shall be additively or subtractively affected.

In place of the simply vertically movable side frames that are provided for the plain adding totalizers the adding and subtracting units, as previously explained, are provided with side plates 278 (Fig. 8) which may be both rocked and lifted. Normally these plates are in such position that the pinions 272 of the subtracting wheels are in mesh with the transfer teeth 295 while the rods 375 are at the lower ends of the elongated guiding slots in the supporting and spacing plates 280. In this position of the plates 278, furthermore, the arcuate slots 390 in the lower portions thereof have their right hand ends (Fig. 8) in contact with studs 391 extending from lifting bails 392 which are similar to the bails 364 for the adding totalizers. Each bail 392 is normally urged in a clockwise direction by a spring 369 but is prevented from moving in this direction by engagement of the cross finger 393 of the bail with the slide bar 370 such as also provided for the plain adding totalizers. This bar, therefore, is shifted at the beginning of an operation of the machine to carry a series of notches 373 below the fingers 393 of all the bails and permits the springs 369 to rock the bails 392 provided notches in the selecting bars 359 controlled by the transaction keys are also beneath the fingers. For the rearmost totalizer (Fig. 8) which represents "total net cash" this will be the case whenever any one of the "Paid out," "Goods returned cash," "Cash," "Received on account," or "C. O. D. paid" keys are active since all of these transactions affect the status of the cash. Assuming now that the bail 392 for this totalizer has been rocked by its spring 369 due to the operation of the machine with the "Cash" key depressed, the toggle link 377 will be straightened out at the proper time to lift the bail 392 and hence the totalizer frame plates 278 until the adding pinions 271 are meshed with the actuating racks while the subtracting wheels are carried out of mesh with the transfer teeth 295. During this movement of the totalizer frame plates the studs 279 and 391 will be lifted to the upper ends of slots 394 in the supporting and spacing plates 280. After the proper amount has been added the toggle link will be returned to its normal position by the return to the left, just as in the previously described universal bank of totalizers (Fig. 4), of the bar 378 which operates all of the toggles simultaneously. The means for shifting this bar will be hereinafter described.

Assuming now that the "Paid out" key has been depressed instead of the "Cash" key. It will be necessary to effect substraction on the rearmost totalizer instead of addition. The operation of the selecting bar 359 and the totalizer lifting mechanism will be precisely the same as explained above. However, the totalizer frame plates must be rocked about the pivot studs 279 until the opposite ends of the arcuate slots 390 are engaged with the studs 391. At this time the adding wheels will be brought into mesh with the transfer teeth 302 while the subtracting wheels will be carried out of mesh with the transfer teeth 295. For so swinging the frame plates 278 a bar 395 is slidably mounted on the rods 396 and carries overturned lugs 397 and 398 (see also Fig. 10) one in front and the other in rear of one of the plates. Normally this bar is, as shown, in a position to permit adding. However, a pin 399 at the forward end of the bar is engaged by a fork 400 (Fig. 10) in an arm 401 which is mounted on a stud 402 extending thru hub 403 secured to the intermediate supporting frame 280. An arm 404 connected with the forked arm by stud 402 carries a pin 405 which cooperates with a cam slot 406 in a portion 407 of the lower rack slide 408 that is controlled by the transaction keys and is associated with this group of totalizers. The slide plate 408 is so moved and the formation of the slot 406 is such that the totalizers are set for addition or subtraction as required. Thus if the rack bar 408 is shifted to the right one or two steps the arms 404 and 401 will be rocked to shift the bar 395 to the right and will rock the swinging plates 278 toward the subtracting position.

The control of the other add-subtract totalizers is substantially the same.

From the foregoing it will be clear that the transaction keys not only determine the selection of the adding and subtracting totalizers but determine the nature of their operation, when selected, as well. Furthermore, it is possible to simultaneously add on one totalizer and subtract from another.

*Timing of totalizer engagement*

It has previously been explained how the rods 375 (Fig. 4) are all lifted upon every operation of the machine by straightening of the toggle links 377. For this purpose, as explained, each group of totalizers is provided with a bar 378 connected to the lower ends of all the related toggles. These bars in turn are connected at their rear ends to downwardly extending arms 379 all of which are secured to the shaft 356, while the corresponding arms 439 related to the banks of item counters are loose on shaft 356.

Figure 12:
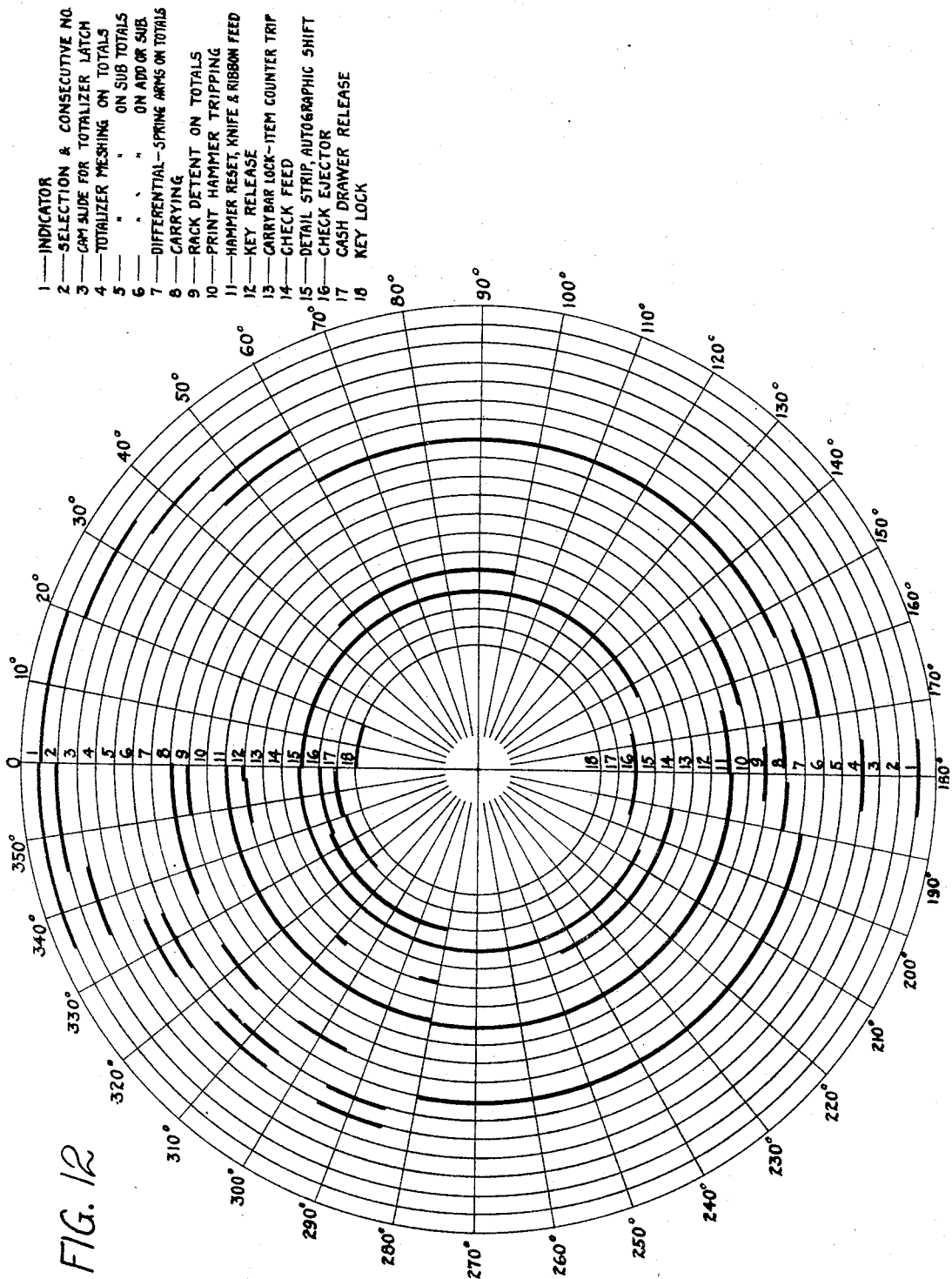
Figure 12 is a chart showing graphically the timing of the major functions performed by the machine.

Referring now to Fig. 3 which shows an elevation of the mechanism at the left of the machine, the shaft 356 has secured thereto an arm 498 which is connected by means of a link 499 to an arm 500 of a bell-crank lever 501. This bell crank is provided with a roller which is adapted to fit into a cam groove or raceway cut in the side of a cam unit 506 which is so formed as to give to the shaft 356 (Figs. 3, 4, 7 and 11) the totalizer engaging movement described hereinafter in connection with the timing chart shown in Fig. 12.

*Timing chart*

The timing chart (Fig. 12) illustrates graphically the sequence of operation of the major functions performed by the machine. The heavy lines used in this chart illustrate the period and duration of activity or movement of the operating parts while the light line portion of any circle designates the idle condition of the represented function. Sudden breaks in the heavy lines indicate points at which the operating members change their direction of movement.

From 35° to 45° the slides 370 holding out the totalizer engaging bails 364 are shifted to allow any of the bails, which have a series of notches in the bars 359, 472, 486, and 496 aligned below their cooperating fingers, to engage the related totalizer lifting frames preparatory to lifting them. If an item entering operation is being performed the totalizers are lifted into mesh with the actuators between 155° and 170° (circle 6).

During the interval between 170° and 190° the carrying and restoring mechanism (circle 8) is operated to move the restoring bars 198 in the direction to restore the transfer plates 194 to normal again. This action restores any of these transfer plates which may have been tripped by a totalizer wheel standing at nine when it goes into mesh with the actuators (between 45° and 60°) on totals. On adding operations this restoring of the carry plates is an idle operation because any tripped plates will merely follow the restoring bar in both directions inasmuch as the selected totalizers will be in raised position in engagement with the actuators throughout this time.

The actuators and other parts of the differential mechanism are restored to normal during the interval between 190° and 280° (circle 7). The totalizer wheels are actuated by this return movement of the actuators on an adding or a subtotal operation. Between 280° and 285° (circle 13) the carrybar lock shaft 216 is turned for the purpose of holding the tripped carrybars in nines coupling position when the totalizers are subsequently lowered out of mesh. Immediately thereafter, 285° to 295° (circles 5 and 6), the totalizers and counters are taken out of mesh with the actuators and are engaged with the carry slides.

From 295° to 305° (circle 8) a carry is effected by every carry slide which is coupled to the carry operating bail 198 or is nines coupled to such a slide. In a universal carry type of bank of totalizers or counters the transfer unit is put into corresponding orders of all nine of the universal accumulators. For this reason in the period from 305° to 315° (circle 6) the selected totalizers are again lifted out of mesh with the carry slides so that during the subsequent period (315°–320°) circle 8, the carrying slides may be restored to normal and thus subtract a unit from those of the universal totalizers (eight in each bank) that were not selected for operation. The movement of the restoring bail for this purpose, extends to and beyond normal position so that the coupling plates are lifted to their normal positions or slightly beyond and are held there. During the interval from 307° to 310° the carrybar lock shaft 216 is turned to release the nines coupled carrybars. From 325° to 335° (circle 6) the totalizers and counters are brought down again into normal position and then in the period from 335° to 360° (circle 8) the carry operating and resetting bail 198 is moved back from its restoring position to normal position and thus permits the coupling plates to drop a slight amount to normal where they engage the appropriate shoulders on the retaining elements. The slides 370 for rocking the totalizer engaging bails 364 are shifted back to normal during the interval from 335° to 345° (circle 3), to carry the cross fingers 363 of the bails out of the notches in the selecting bars 359 below, thus allowing the selecting mechanism, in the period from 345° to 360° (circle 2) to restore these bars and connections controlled by the special keys to normal position.

While several forms of the present invention disclosing its many novel and improved features has been disclosed herein, it is to be understood that numerous modifications may be made in the specific constructions illustrated and described without departing from the spirit or scope of the invention. Not only is it contemplated that changes may be made in the specific mechanisms provided for the accomplishment of various functions but if desired parts may be omitted or rearranged to bring about variations in the results effected. It is not desired to be limited other than by the scope of the claims which follow:

What I claim is:

1. In a device of the class described, a shaft, a series of totalizer wheels mounted on said shaft, a transfer controlling projection associated with each of said wheels, a transfer trip member cooperating with each of said projections for operation thereby, a coupling member for each of said transfer trip members adapted to be positioned under the control of its respective trip member, each of said coupling members having two shifted positions, each of said trip members being upon movement of its associated wheel to the nines position shifted from normal to another position and being restored to normal position upon movement of said wheel from the nines position to the zero position, connecting means between each of said transfer trip members and its associated coupling member effective to cause said coupling member to be moved to the first of its shifted positions when the transfer trip member is moved from normal to shifted position and for causing said coupling member to be advanced in the same direction to its second shifted position when the transfer trip member is restored to its normal position upon the movement of its associated wheel from the nines to the zero position, means common to said coupling member effective for operating any coupling members when shifted to their second positions, means for coupling adjacent coupling members when one thereof is in its first shifted position, and transfer actuators connected to said coupling members and operated thereby when their respective coupling members are operated by said common means, said transfer actuators serving when operated to advance the totalizer wheel of the next higher order to effect carrying thereto.

2. In a machine of the class described a plurality of totalizers each comprising a shaft supporting a plurality of wheels of successive orders said shafts being parallel to each other and the wheels of the same order of each totalizer lying in the same plane, transfer trip bars common to the like orders of all of said totalizers, transfer actuators common to the like orders of all of said totalizers, coupling devices carried by said actuators, a common operating member for operating said devices, and means controlled by said trip bars for controlling the operation of said coupling devices to couple the latter to said operating member, said means being adapted to condition said devices for the operation of one by the other.

3. In a device of the class described a plurality of totalizers each comprising a shaft supporting a plurality of wheels of successive orders, said shafts being parallel to each other and the wheels of the same order of each totalizer lying in the same plane, transfer trip bars common to like orders of all said totalizers and adapted to be controlled by the wheels, transfer actuators common to like orders of said totalizers, each of said trip bars and actuators being related to a definite order, an operating member, coupling devices pivoted to said actuators and controlled by said trip bars, and means controlled by a lower order trip bar upon passage of a related wheel of any of said totalizers to zero for shifting the next higher order device into cooperation with the operating member, said means being adapted to couple a higher order device with a lower order device when the corresponding higher order trip bar is operated by movement of any of the related wheels to the nine position.

4. In a device of the class described a plurality of totalizer wheels of successive orders, transfer actuators therefor, an operating bar for said actuators, spring tensioned plates adapted to connect said actuators to said bar, a shouldered member normally holding each of said plates in ineffective position, means for shifting one of said members to permit one step of movement of one of said plates upon turning of a lower order wheel to its nine position and means for returning said member to normal upon passage of the wheel to zero, said return movement permitting a second step of movement of said plate to connect an actuator with said bar.

5. In a machine of the class described a totalizer comprising a series of wheels of successive orders, a series of subtracting wheels inter-geared with said first mentioned wheels, transfer trip elements common to said two series of wheels, transfer actuators common to said two series of wheels, means for shifting said two series of wheels to alternately carry one series into cooperation with said elements and the other series into cooperation with said actuators, and means operated by said elements for controlling the operation of said actuators.

6. In a machine of the class described a totalizer comprising a series of adding wheels of successive orders, a series of subtracting wheels inter-geared with said first mentioned wheels, gears associated with each of said wheels, differentially movable actuators with which said gears may be meshed, transfer trip elements one for each order common to said two series of wheels, transfer actuators one for each order arranged to actuate either of said two series of wheels, means for shifting said two series of wheels to alternately carry one series into cooperation with said transfer trip elements and the other series nearer to said differential actuators, means for shifting said totalizer bodily from the position set forth above to the position where the wheel which was in cooperation with the transfer actuator is moved away therefrom, and the wheels inter-geared therewith moves further toward the differential actuators so that its gear meshes with said differential actuator, and means operated by said elements for controlling the operation of said transfer actuators.

7. In a machine of the class described a plurality of totalizers each comprising a plurality of elements of successive orders, differential actuators therefor common to like orders of said totalizers, transfer actuators for effecting transfers in said totalizers common to like orders of said totalizers, said transfer actuators normally engaging like orders of all said totalizers, means for selectively engaging one of said totalizers with the differential actuators and concomitantly disengaging said totalizer from said transfer actuators, means for operating said differential actuators, means controlled by said totalizers for causing said transfer actuator to operate in any order upon the next lower order element passing to zero to effect transfers in said certain orders of all of said totalizers, means for then disengaging only the said selected totalizer from said transfer actuators, means for then operating the transfer actuators for subtracting a unit from said certain orders of all said totalizers which remain in engagement with said transfer actuators.

8. In a machine of the class described a totalizer comprising inter-geared sets of adding and subtracting wheels, actuators therefor common to the two sets of wheels, transfer actuators common to said two sets of wheels, a pivotally supported oscillatable frame for supporting said wheels and adapted to normally maintain one of said sets in position nearer to said actuators than the other set, the other being in engagement with the transfer actuators, an operating mechanism, and means operated by the operating mechanism effective to oscillate said frame to cause the second mentioned set of wheels to move into position nearest to the actuators and to move said first mentioned set of wheels into engagement with the transfer actuators, and means operated by the operating mechanism effective to shift said frame bodily.

9. In a machine of the class described a totalizer comprising a series of adding wheels of successive orders, a series of subtracting wheels intergeared with said first mentioned wheels, gears associated with each of said wheels, differentially movable actuators with which said gears may be meshed, transfer trip elements one for each order common to said two series of wheels, transfer actuators one for each order arranged to actuate either of said two series of wheels, means for shifting said two series of wheels to alternately carry one series into cooperation with said transfer trip elements and the other series nearer to said differential actuators, means for shifting said totalizer bodily from the position set forth above to the position where the wheel which was in cooperation with the transfer actuator is moved away therefrom and the wheel intergeared therewith moves further toward the differential actuator so that its gear meshes with said differential actuator, and means operated by said elements for controlling the operation of said transfer actuators, the said adding wheel gears, subtracting wheel gears, differential actuators and transfer actuators being so dimensioned, arranged and controlled that either the adding wheel gears or the subtracting wheel gears are always partly or wholly in mesh with either the corresponding differential actuator or the corresponding transfer actuator.

10. In a device of the class described a plurality of totalizer wheels of successive denominational orders, slides for effecting transfer operations of the higher order wheels, coupling plates pivotally connected to said slides, means for shifting any of said plates to one position upon movement of the next lower wheel to the nine position, said plate being shifted to a second position upon movement of said wheel to the zero position, means for operating any plates which have been shifted to the second position to effect transfers, and projections on said plates for engaging adjacent ones of the latter when in their first shifted positions, said projections serving to couple a higher order plate in its first shifted position to a next lower order plate in its second shifted position for simultaneous operation of said plates.

11. In a device of the class described a plurality of totalizer wheels, a trip projection carried by each wheel, a transfer actuator for each wheel, an operating bar, a spring tensioned plate pivoted to each of said actuators, a device adapted to be shifted upon movement of a lower order wheel to zero position for controlling the engagement of the next higher plate with said operating bar, and a device adapted to be shifted upon movement of said higher order wheel to the nine position for controlling the movement of a portion of the next higher order plate into the path of movement of the first mentioned plate whereby both plates and the connected actuators are adapted to be simultaneously operated by said bar.

12. In a machine of the class described a plurality of totalizers each comprising a plurality of wheels of successive orders, transfer projections carried by said wheels, trip bars common to like orders of all of said totalizers and adapted to be operated by said projections, transfer actuators common to like orders of all of said totalizers, an operating member common to said actuators, pivoted elements adapted to connect said actuators to said member, said elements having two steps of movement from normal, projections carried by said elements, and means controlled by said trip bars to permit two steps of movement of said elements when any of the related wheels pass to zero, thereby connecting corresponding actuators to said member, said means permitting one step of movement of said elements when related wheels pass to nine, the projections being so constructed and arranged that the corresponding projection of the higher order is placed in the path of the projection of the next lower order element if the latter has moved two steps.

13. In a machine of the class described a totalizer comprising a series of wheels of successive orders, a series of subtracting wheels inter-geared with said first mentioned wheels, transfer trip elements common to said two series of wheels, transfer actuators common to said two series of wheels, means for shifting said two series of wheels to alternately carry one series into cooperation with said elements and the other series into cooperation with said actuators, means for reversing the relation between said series of wheels and said elements and actuators, and means operated by said elements for controlling the operation of said actuators.

14. In a machine of the class described a plurality of totalizers each comprising a series of pinions, actuating racks for said totalizers each common to the like orders of said totalizers, a series of toothed transfer members one for each order of said totalizers, said totalizers being normally engaged with said transfer members, an operating mechanism, means operated twice upon each cycle of operation of said mechanism for selectively shifting said totalizers into cooperation with said actuating racks and from engagement with said transfer members, and means common to said transfer members for driving the latter, said last mentioned means being operated by said mechanism upon the return of said totalizers to normal after the first shifting and being restored upon the second shifting of said totalizers.

15. In a machine of the class described, a shaft, a plurality of totalizer pinions of successive denominational orders mounted for rotation on said shaft, a single-toothed disc of greater diameter than said pinions secured to each of said pinions and having its free side adjacent to and in contact with the next higher order pinion, a plurality of racks adapted to drive said pinions one for each of said pinions and bounded by substantially the same planes as said pinions and of a thickness to substantially fill the space between adjacent discs, a plurality of transfer trip elements adapted to be actuated by the tooth of the corresponding disc, one for each such disc and of a thickness to substantially fill the space between adjacent racks, whereby said discs, pinions, racks and transfer trip elements serve to hold each other in proper relative position axially with respect to said shaft.

16. In a machine of the class described, a shaft, a plurality of totalizer pinions of successive denominational orders mounted for rotation on said shaft, a single-toothed disc of greater diameter than said pinions secured to each of said pinions and having its free side adjacent to and in contact with the next higher order pinion, a plurality of racks adapted to drive said pinions one for each of said pinions and bounded by substantially the same planes as said pinions and of a thickness to substantially fill the space between adjacent discs, a plurality of transfer trip elements adapted to be actuated by the tooth of the corresponding disc, one for each such disc and of a thickness to substantially fill the space between adjacent racks, and plates controlled by said respective trip elements for entering a transfer unit into the respective higher order pinion, said plates being bounded by substantially the same planes as said pinions and of a thickness to substantially fill the space between adjacent discs, whereby said discs, pinions, racks, transfer trip elements and transfer entering plates serve to hold each other in proper relative position axially with respect to said shaft.

17. In a machine of the class described, a shaft, a plurality of totalizer pinions of successive denominational orders mounted for rotation on said shaft, a single-toothed disc of greater diameter than said pinions secured to each of said pinions and having its free side adjacent to and in contact with the next higher order pinion, a plurality of racks adapted to drive said pinions one for each of said pinions and bounded by substantially the same planes as said pinions and of a thickness to substantially fill the space between adjacent discs, a plurality of transfer trip elements adapted to be actuated by the tooth of the corresponding disc, one for each such disc and of a thickness to substantially fill the space between adjacent racks, and plates controlled by said respective trip elements for entering a transfer unit into the respective higher order pinion, said plates being bounded by substantially the same planes as said pinions and of a thickness to substantially fill the space between adjacent discs, whereby said discs, pinions, racks, transfer trip elements and transfer entering plates serve to hold each other in proper relative position axially with respect to said shaft, and means for shifting said pinions into cooperation alternatively with said racks and said transfer entering plates.

WILLIAM S. GUBELMANN.